Figure 4:
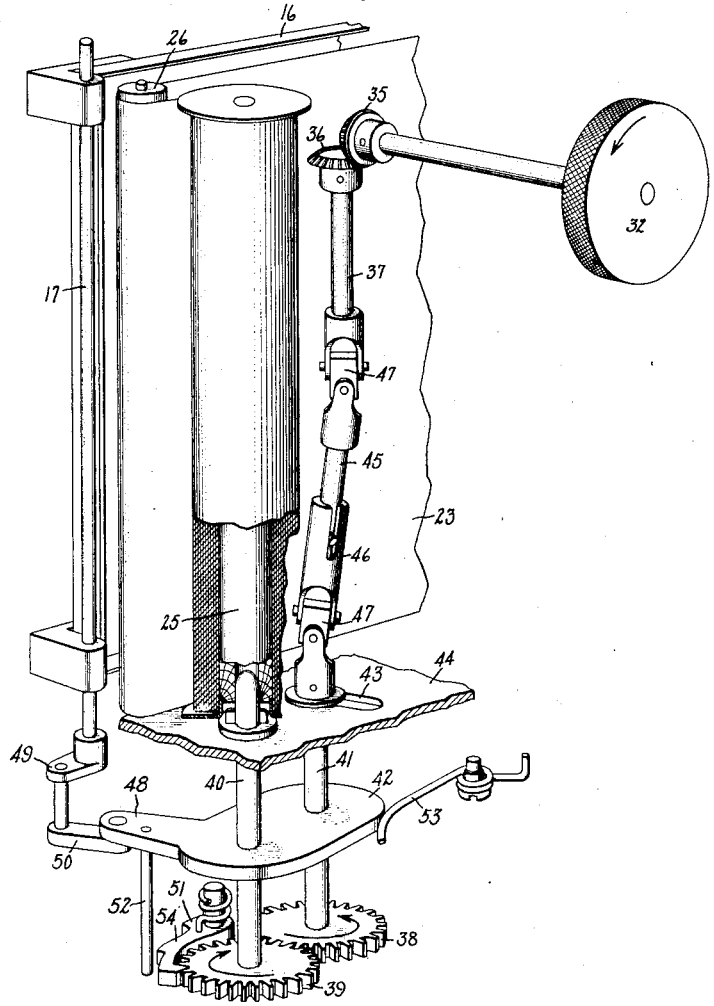

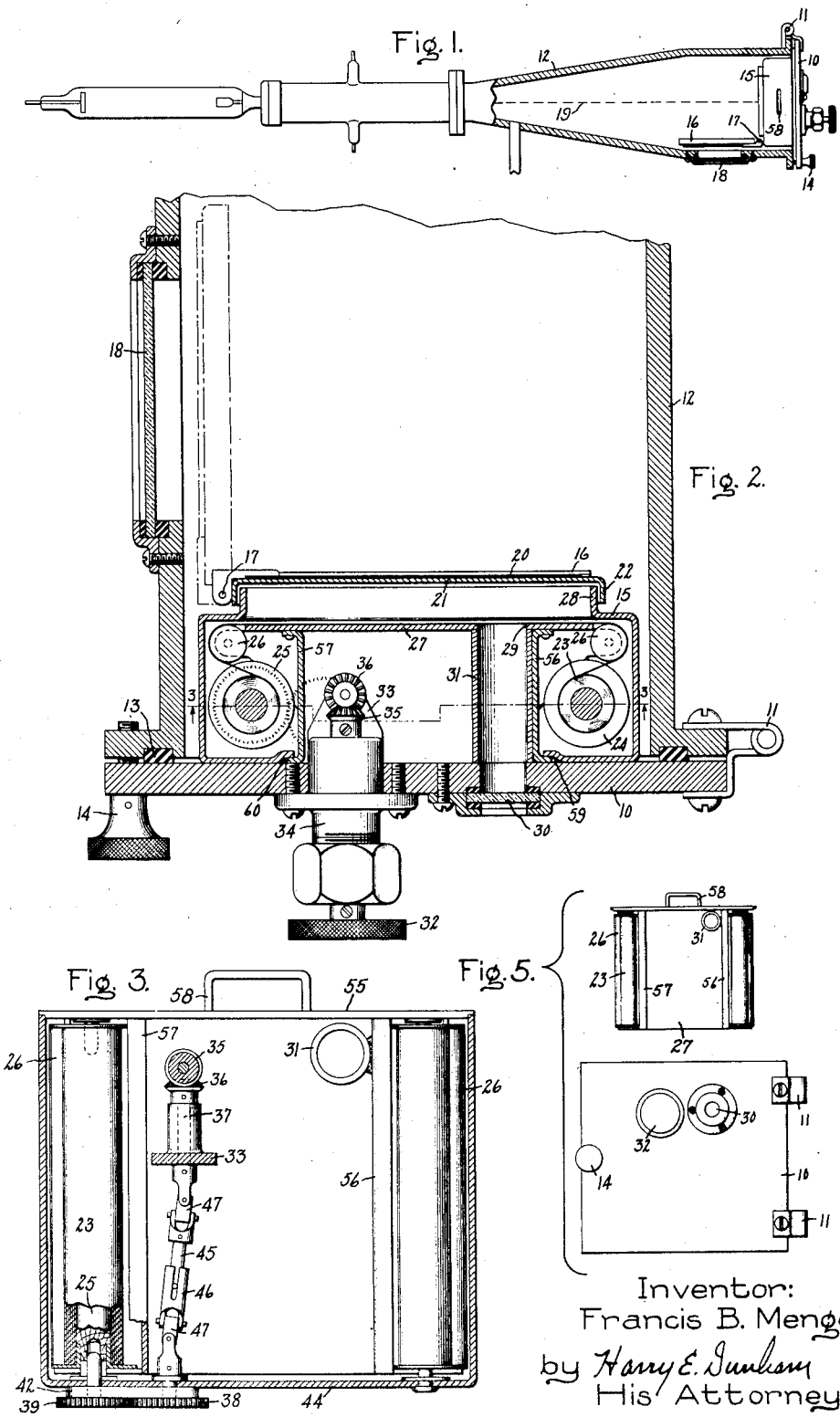

Aug. 31, 1937.   F. B. MENGER   2,091,826
OSCILLOGRAPH FILM HOLDER MECHANISM
Filed April 17, 1936   2 Sheets-Sheet 2

Inventor.
Francis B. Menger,
by Harry E. Dunham
His Attorney.

Patented Aug. 31, 1937

2,091,826

UNITED STATES PATENT OFFICE 2,091,826

OSCILLOGRAPH FILM HOLDER MECHANISM

Francis B. Menger, Lancaster, Pa., assignor to General Electric Company, a corporation of New York Application April 17, 1936, Serial No. 74,942

6 Claims. (Cl. 234—61)

My invention relates to a film holder mechanism especially adapted for use on cathode ray oscillographs.

In certain types of cathode ray oscillographs, the screen end of the oscillograph is provided with means for photographing the trace of the cathode ray beam. For best results, the film is placed within the evacuated oscillograph tube so as to receive the direct ray without distortion or diminution. When the film is used inside the oscillograph tube, it is necessary that the tube be sealed and evacuated each time the film is replaced before a record can be taken.

It is desirable also to provide a screen on which the trace of the cathode ray beam may be viewed and adjusted prior to taking a permanent record so as to be sure that the important part of the curve will come on the film and be of the proper intensity, etc. This focusing operation should be done with the film in place and the oscillograph tube properly evacuated and otherwise ready for the making of a record so as to avoid possible change in the conditions affecting the focus before a record can be obtained. Also, this focusing operation must be accomplished without clouding or exposing the fresh film.

It is the primary object of my invention to provide a film holder mechanism and viewing screen that will permit proper focusing, direct exposures, and otherwise meet the requirements of the making of cathode ray oscillograph records within the cathode ray tube with a minimum of labor and time incident to opening, sealing, and evacuating the tube.

In carrying the invention into effect, I mount a roll film holder on the inside of a door at the screen end of the tube. Also hinged on the inside of this door is a combined viewing screen and shutter that may be swung from a position between the film and cathode ray beam, where its exposed surface may be seen through a window in one side of the tube, to a position exposing the film to the direct rays of the cathode beam. A single operating shaft sealed through the door is provided for selectively advancing the film or swinging the viewing screen so that the film may be advanced and the viewing screen may be moved from focusing to exposure position and vice versa as desired while the tube is sealed and ready for or in operation. Thus I provide a roll film camera within the tube operable from without the tube when the tube is sealed and exhausted.

The features of my invention which are believed to be novel and patentable will be pointed out in the claims appended hereto. For a better understanding of my invention, reference is made in the following description to the accompanying drawings in which similar parts are designated by like reference characters in the different figures.

Fig. 1 represents in outline a cathode ray oscillograph tube showing the film holder door of my invention at the screen end thereof; Fig. 2 is a sectional view through the film holder and screen end of the cathode ray tube with the film holder in place, with the door closed and sealed, and with the viewing screen in a focusing position where it acts as a shutter for the film; Fig. 3 shows a view of the film holder taken on the general line 3—3 of Fig. 2; Fig. 4 is a perspective view of the film-advancing and screen-moving operating mechanism, and Fig. 5 is an outside end view of the door showing how the film holder may be removed therefrom when it is desired to change the film.

Referring now to the drawings for a more detailed description, it will be seen in the general view, Fig. 1, that the film holder door 10 is hinged at 11 to the screen end of the oscillograph tube 12 and comprises an end door thereof which may be sealed in the closed position indicated in order that the tube may be evacuated. Sealing is made possible by a suitable gasket 13 (Fig. 2) and clamping screw 14. It will be understood that, by loosening the screw 14, the door may be swung open about hinge 11 and the film holder may be slid upward (see Fig. 5) to change the film which is contained within the film holder 15 mounted on the inside of the door. The door constitutes the back wall of the camera. 16 represents the viewing screen and shutter which is hinged at one side of the inner side of the film holder at 17 in order that it may be swung from the viewing position shown in full lines in Fig. 2 to the film-exposure position shown in Fig. 1. The film-exposure position of this screen is also represented in dotted lines in Fig. 2. A window 18 is provided in the side wall of the tube 12 near the screen end thereof so that, when the screen 16 is in the focusing or viewing position, one may look through the window 18 and view the trace of the cathode ray beam on the viewing screen 16. The general path of the beam is indicated by dotted line 19, Fig. 1. The viewing surface of the screen 16 is coated with a fluorescent material 20 in order that the cathode trace thereon will persist a sufficient length of time for the human eye to observe its general characteristics through the window 18. The screen also has a metal backing plate 21 of such thickness that none of the cathode rays will penetrate through and cloud the film when the screen is in the focusing or viewing position. The shutter screen preferably has its metal part turned back at the edges 22 so as to fit closely over the inner opening in the film holder or is otherwise arranged to provide a light-tight shutter arrangement when closed.

The roll film 23 is contained in the film holder between a supply spool 24 and a reroll spool 25. Between these spools, the film passes over guide rollers 26 and a flat supporting plate 27 with the sensitive surface of the film towards the opening 28 in the film holder facing the shutter 16 so that, when the shutter is open, the sensitive surface of the film may be exposed to the direct rays of the cathode beam. The plate 27 has a small opening 29 therein opposite a transparent window 30 sealed in the door 16 in order that the usual positioning numbers provided on the back of the film may be seen through the window and the film properly advanced and positioned when taking consecutive records. A tubular part 31 preferably connects the window 30 with the opening 29.

In order that the film 23 may be advanced and the shutter screen 16 operated without opening the tube, I provide a single operating mechanism which may be actuated from the exterior of the tube by turning the knurled thumb knob 32. This mechanism is so arranged that turning the knob 32 in one direction advances the film and turning the knob in the opposite direction opens the shutter. When the shutter is open, however, the turning of the knob 32 in the direction to advance the film first closes the shutter. This mechanism is operated through a shaft extending from the external thumb nut 32 through a stuffing box 34 in the door wall and it will be understood that the stuffing box is filled with a heavy grease packing under pressure or is otherwise arranged to prevent leakage of air therethrough in order that a vacuum may be created in the tube and maintained when the door is closed and sealed.

The film-advancing and shutter-screen operating mechanism is best understood from a consideration of Fig. 4 where it is illustrated in a perspective and partially expanded view, the door structure being omitted. The drive train for winding up the reroll spool 25 continues from the shaft of thumb nut 32 through bevel gears 35 and 36, a flexible shafting system to gear 38 and gear 39, to the drive shaft 40 for the reroll spool 25. The upper end portion 37 of the flexible shafting system is supported in a suitable stationary bearing structure, part of which is shown at 33, Fig. 2. The lower end portion 41 to which gear 38 is secured has a bearing in a plate 42, which plate is pivoted on shaft 40. Shaft section 41 extends through an arc-shaped slot 43 in the film box supporting plate 44, the arc 43 having as its center the axis of shaft 40. Between shaft sections 37 and 41, there are telescoping shaft sections 45 and 46, respectively joined to the shaft sections 37 and 41 by universal joints 47.

It will be seen that this construction permits rotational movement to be transmitted through the flexible shaft system and also permits the shaft section 41 with its bearing plate 42 to be bodily rotated about shaft 40 as a center to the extent permitted by the arc-shaped slot 43 in plate 44. When the shaft section 41 is thus moved about shaft 40, gear 38 rolls on gear 39. The position of shaft 41 at the left end of the arc-shaped slot 43 as shown in Fig. 4 is the normal position of this shaft when rotational movement is being transmitted therethrough to wind up the reroll spool 25 to advance the film 23. The bodily movement of the shaft 40 to the right end of slot 43 occurs when the shutter 16 is being swung to the open or film-exposure position, and shaft 41 moves from the right to the left in slot 43 when the shutter 16 is being swung in the opposite direction to the viewing or focusing position, which is the position of screen 16 shown in Fig. 4.

This swinging movement of shutter screen 16 is accomplished through a crank and link connection between the arm 48 of plate 42 and an arm 49 secured to the shaft 17 of the shutter screen. It will be noted that a link 50 is connected between pivot pins in the extremities of crank arms 48 and 49. Shaft 17 is supported in bearings, not shown, in the end plates of the film holder.

In order for the gear 38 to roll on gear 39 when it is desired to move the shutter 16 by a turning movement transmitted from thumb nut 32, it is necessary to prevent gear 39 from turning. This is also desirable to prevent advancing of the film during opening and closing movements of the shutter and during the time it is open. This is accomplished by a pawl 51 spring pressed against the toothed surface of gear 39 and by a locking pin 52 extending adjacent the back side of pawl 51 from the swinging plate 42. The shape of the tooth at the end of pawl 51, where it contacts with the gear 39, is such that gear 39 can never be turned in a counterclockwise direction as viewed in Fig. 4. Gear 39 may, however, be turned in a clockwise direction when the locking pin 52 is in the withdrawn position shown, as the shape of the tooth on the near side of pawl 51 has a slope which permits it to rise and slip over the teeth in gear 39 when the latter is turned in a clockwise direction. Thus, it will be clear that, with the parts in the position shown, the shutter 16 being closed, the film may be advanced by turning thumb nut 32 in a counterclockwise direction. The arrows on parts 32, 38 and 39 indicate the direction of rotation of these parts for advancing the film. It will also be noted that this direction of movement transmitted from thumb nut 32 tends to move shaft 41 to the left end of slot 43 or to maintain it there when it is in such position so that the shutter is prevented from opening when the film is being advanced. A spring 53 is preferably provided to exert pressure on plate 42, tending to turn it in a counterclockwise direction. This keeps the shutter closed tight except when it is positively opened in the manner explained below.

To open the shutter, the operator turns the thumb nut 32 in a clockwise direction. This movement is transmitted to gear 38 with a tendency to turn gear 39 in a counterclockwise direction. As pointed out above, gear 39 is locked from turning in a counterclockwise direction by reason of the shape of the tooth of pawl 51. As a result, gear 38 rolls on the locked gear 39, moving shaft 41 to the right end of slot 43 and rotating plate 42 in a clockwise direction about shaft 40 by a corresponding amount. This movement of plate 42 turns shaft 17 counterclockwise and opens the shutter through the crank and link connection at 50. During this movement, pin 52 swings over and close to a raised arc-shaped portion 54 on the back of pawl 51. Part 54 of the pawl conforms substantially to the arc of a circle whose center lies in the axis of shaft 40 when the pawl is in the position shown with its tooth meshing between two teeth on gear wheel 39. The pin 52 thus locks the pawl 54 in and locks gear 39 from turning in either direction as soon as the shutter 16 begins to open, and the pin 52 is not removed from this locking position until the shutter has been closed again. It will thus be evident that, when the shutter is open, the film cannot be advanced and that, when the thumb nut 32 is turned in a film-advancing direction with the shutter open, the shutter will close and shaft 41 will move to the left end of slot 43 at which time pawl 51 and gear 39 are unlocked. Then, turning the thumb nut 32 further in the same direction will advance the film. As actually built, gears 38 and 39, swinging plate 42, and supporting plate 44 lie close together.

As indicated in Figs. 2, 3 and 5, the film holder is preferably made in two separable portions in order to facilitate changing the film therein. Fig. 5 shows the removable portion as pulled upward from the part fixed to the door 10, while Fig. 2 shows both portions as assembled. The removable portion includes the following parts: Upper end plate 55, film-supporting plate 27, supporting guide pieces 56 and 57, and sight tube 31. The guide rollers 26 are also supported by the film holder portion of Fig. 3, and the end plate 55 thereof carries bearing pins for one end of the film spools 24 and 25.

When the door 10 is open, the removable portion of the film holder shown may be pulled upward by the handle 58 and removed from the remaining portion which is secured to the inside of the door (see Fig. 5). The portion which remains on the door has guide recesses 59 which are adapted to receive the turned-out edges 60 of the guide sections 56 and 57 of the removable portion of this film holder. The two portions thus fit together in telescoping relation. When thus removed, the removable portion brings with it the film spools which are now easily accessible for changing.

It will be evident that, with the arrangement described, a sufficient length of film may be contained within the film holder to take several records without the necessity of opening the tube and that the film may be advanced and the shutter swung from closed to open position and vice versa as required without opening the tube. It is only necessary to open the tube when replacing an exposed film with an unexposed film and thus frequent sealing and exhausting operations are avoided. My invention in effect provides a roll film camera for direct exposure recording operated from the exterior of the oscillograph tube.

In accordance with the provisions of the patent statutes, I have described the principle of operation of my invention together with the apparatus which I now consider to represent the best embodiment thereof but I desire to have it understood that the apparatus shown is only illustrative and that the invention may be carried out by other means.

What I claim as new and desire to secure by Letters Patent of the United States is:

1. Apparatus for making cathode ray records by direct exposure of a photosensitive film to the cathode ray, said mechanism comprising a camera mounted on the inside of a door adapted to close and hermetically seal the screen end of a cathode ray tube, the door comprising the back wall of the camera, said camera having a roll film, film-advancing means, and a shutter on the inner side of said door, and common operating means connected to said film-advancing means and shutter, extending through said door to the outside thereof and operable from the outer side to selectively advance said film or operate said shutter.

2. In combination with a cathode ray tube, a sealable door therefor at the screen end of such tube, a roll film camera supported on the inside of said door, said camera having a shutter which, when closed, constitutes a viewing screen for the trace of the cathode ray of said tube and, when open, allows said ray to trace directly on the film of such camera, and a rotatable shaft sealed through said door having operating connections to said camera for advancing the film thereof and operating said shutter so arranged that rotation of said shaft in one direction closes the shutter if open and then advances the film and rotation in the opposite direction opens said shutter.

3. A cathode ray tube having a door at the screen end thereof, a roll film camera mounted on the inside of said door with the door serving as the rear wall of such camera, facilities for sealing said door in closed position in order that the tube may be exhausted, said camera being in position to take pictures of the trace of the ray of said tube when said door is closed, and single operating means sealed through said door for selectively advancing the film and opening and closing the shutter of said camera.

4. In combination with a cathode ray tube, a door therefor at the screen end of such tube, facilities for opening and closing said door and sealing the closure in order that the tube may be exhausted, a film holder supported on the inner side of said door having means to support and advance a film across the end of said tube and directly expose such film to the cathode ray beam of said tube for recording purposes, a shutter for said film holder supported on the inner portion of said door and movable to and from exposure position with respect to such ray-recording system, and single operating means, sealed through said door and operable when said door is closed, for selectively operating said film-advancing means and said shutter.

5. In combination with a cathode ray oscillograph tube, a door therefor at the screen end of said tube, facilities for sealing said door in closed position in order that the tube may be exhausted, a roll film camera supported on the inside of said door with its exposure opening facing away from said door, and a single operating means, sealed through said door and operable from the exterior of said tube when said door is closed, for selectively advancing the film and operating the shutter of said camera.

6. Photographic recording apparatus having a roll film camera with a reroll spool and shutter, a mechanism for selectively operating the shutter and spool comprising a drive shaft and a spool shaft which are geared together, the drive shaft being mounted for limited bodily movement about the axis of the spool shaft and connected with the shutter in such a way that such bodily movement in one direction opens the shutter and the opposite bodily movement closes the shutter, and means for preventing rotation of the spool shaft in either direction when the shutter is open and for preventing backward rotation only of the spool shaft when the shutter is closed, whereby rotation of said drive shaft in one direction first closes the shutter if open and then advances the spool shaft and rotation of said drive shaft in the opposite direction opens the shutter.

FRANCIS B. MENGER.